Sept. 4, 1934. R. PRAHAR Re. 19,306

RECEPTACLE FRAME

Original Filed Feb. 7, 1931

Robert Prahar
INVENTOR

BY Ralph E. Clayton
ATTORNEY

Reissued Sept. 4, 1934

Re. 19,306

UNITED STATES PATENT OFFICE 19,306

RECEPTACLE FRAME

Robert Frahar, Brooklyn, N. Y., assignor to David Karron, Inc., Brooklyn, N. Y., a corporation of New York Original No. 1,923,687, dated August 22, 1933, Serial No. 514,104, February 7, 1931. Application for reissue May 15, 1934, Serial No. 725,828

4 Claims. (Cl. 150—29)

This invention relates to frames, and more particularly to a frame for hand bags and similar receptacles of the type in which the edge of the pouch or bag fabric is locked or secured within an outwardly opening channel of the frame to partly or wholly conceal the outer side of the latter.

Heretofore such bag frames have been provided with latching elements for the opposed frame members extending within the channels thereof and partly obstructing the same, said elements usually being soldered to the inner walls of the channels. Thus the proper insertion of the bag fabric into the channels was rendered difficult, and in the frequent opening and closing of the bags the frame walls were distorted or the latch elements were broken off.

The present invention, therefore, has for its principal object to provide a one-piece frame member of sheet metal, which in addition to the upwardly or outwardly opening fabric receiving channel is provided with an auxiliary inwardly or downwardly opening channel, the bottom or base wall of which affords convenient means for securely attaching a latching element thereto while said channels are separated by a common wall which serves to mutually strengthen the channeled sections of the frame member and resist distorting strains, while the inner walls of the auxiliary channel provide an extensive area of contact with an opposed frame member when the bag or receptacle is closed.

While one embodiment of the invention is illustrated in the accompanying drawing, it is to be understood that this embodiment merely serves as an illustration of the underlying principles of the invention so that they may be readily understood by those skilled in the art, and is not intended as limiting the invention to the specific form disclosed therein.

Figure 1:
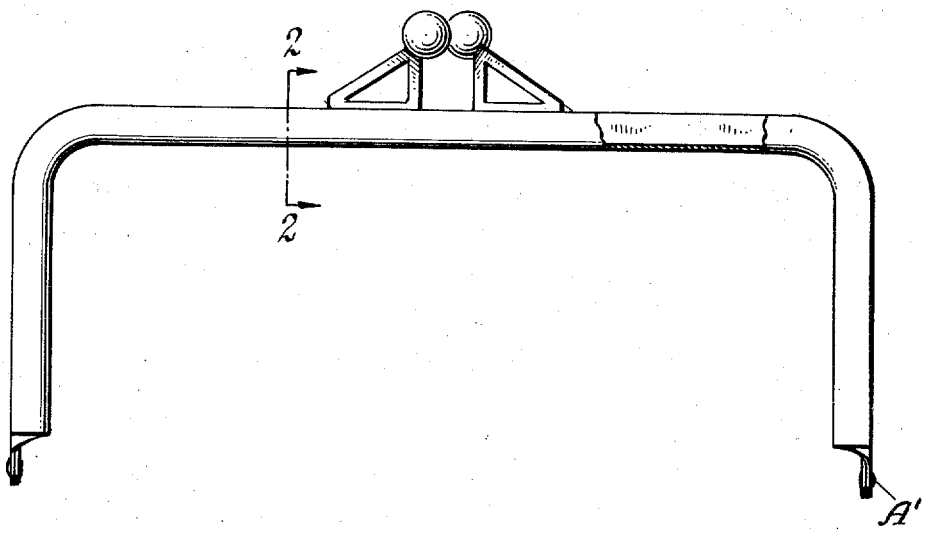
Fig. 1 is a side elevation, partly in section.
Figure 2:
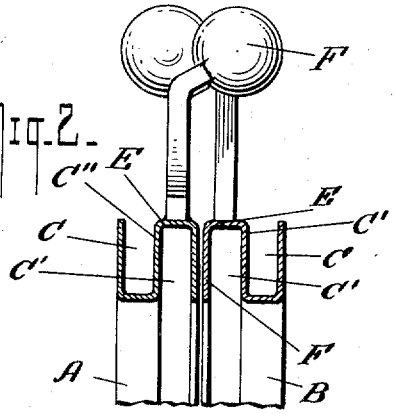
Fig. 2 is a fragmentary cross section showing the channels in position to receive the fabric.

Referring in detail to the drawing, for purposes of illustration, I have shown my invention applied to a hand bag frame comprising the frame members A and B, hinged together at their corresponding ends in the conventional manner, as indicated at A'.

Each frame member is formed from a strip of sheet metal, die stamped to provide opposite edge portions thereof with the channels C and C' respectively, extending throughout the length of the frame member, and opening in relative opposite directions. Thus the channel C opens upwardly or outwardly while the channel C' opens downwardly or inwardly. These channelled edge portions are connected by the intermediate portion C'' of the strip which forms a common separating wall between the channels. Preferably, I have shown the two channels C and C' of equal depth.

Figure 3:
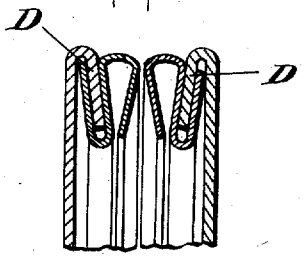
Fig. 3 is a section of Fig. 1 on the line 3—3 and showing the manner in which the fabric is locked to the frame.

In the use of frame members of the above description in the manufacture of hand bags and other receptacles, the edges of the flexible material of the bag or pouch walls extend over the walls of the outer channels C of the frame members A and B and are turned inwardly and downwardly into said channels, in which they are then securely fastened by clinching the material between the channel walls, as indicated at D in Fig. 3 of the drawing. The cross-sectional configuration of the frame members, as shown in this figure is merely suggestive. Further, instead of these clinching the edges of the fabric in the channels, an inlay strip or other auxiliary means may be employed for securely locking the edges of the bag fabric in the frame channels, if preferred.

The inner opposing walls F of the channels C' afford an extensive area of contact between the frame members A and B to resist distorting strains when the bag is closed.

Any suitable type of latch means may be provided to releasably hold the frame members in closed position. For this purpose I have shown latch members F' of conventional form which may be riveted, soldered or otherwise securely fixed to the top walls or flanges E of the channels C'. Thus the channels C remain unobstructed so that the edges of the bag fabric may be easily and quickly fitted therein.

From the above description it will be seen that my invention provides a frame member which may be rapidly fabricated at small cost and utilized in the production of hand bags and other receptacles of novel and attractive forms. The new frame construction also offers maximum resistance to transverse and longitudinal bending strains, and will, therefore, be very durable and serviceable in practical use. The contour or shape of the frame as shown in Fig. 1 of the drawing may be varied at will and the transverse spacing of the channel walls is predetermined in accordance with the requirements of the case.

I claim:

1. A receptacle frame comprising a pair of hinged opposed frame members, each of the frame members having a downwardly opening channel having dependent walls the inner walls of the downwardly opening channels of the opposed frame members contacting with each other when the frame is closed, and an upwardly opening fabric receiving channel having upwardly extending walls, one of the inner walls of the upwardly opening channel being common with a wall of the downwardly opening channel and the ends of the upwardly extending walls being adapted to be forced into locking engagement with a fabric to clamp the same.

2. A receptacle frame comprising a pair of hinged opposed frame members each having a downwardly opening channel and an upwardly opening fabric receiving channel, a common connecting wall between said channelled portions of the frame member, the opposing side wall of said upwardly opening channel being adapted to be forced into locking engagement with a fabric positioned in said channel, and the opposing walls of the downwardly opening channels of said frame members contacting with each other when the frame is closed.

3. A frame member comprising a sheet metal strip having its opposite edge portions bent to form longitudinal channels opening in relatively opposite directions and the intermediate portion of said strip constituting a common separating wall between said channels.

4. A frame member for receptacles comprising a sheet metal strip having reversely bent edge portions to form continuous channels having a common connecting wall formed by the intermediate portion of said strip, said channels opening in relatively opposite directions, and a latching member mounted on the base wall of one of said channels, exteriorly thereof, and projecting therefrom in parallel relation to said connecting wall.

ROBERT PRAHAR.